March 23, 1948.  R. E. HORGER  2,438,214
ROLLER BEARING RAILWAY CAR AXLE AND JOURNAL BOX ASSEMBLY
Filed May 22, 1944  3 Sheets-Sheet 1
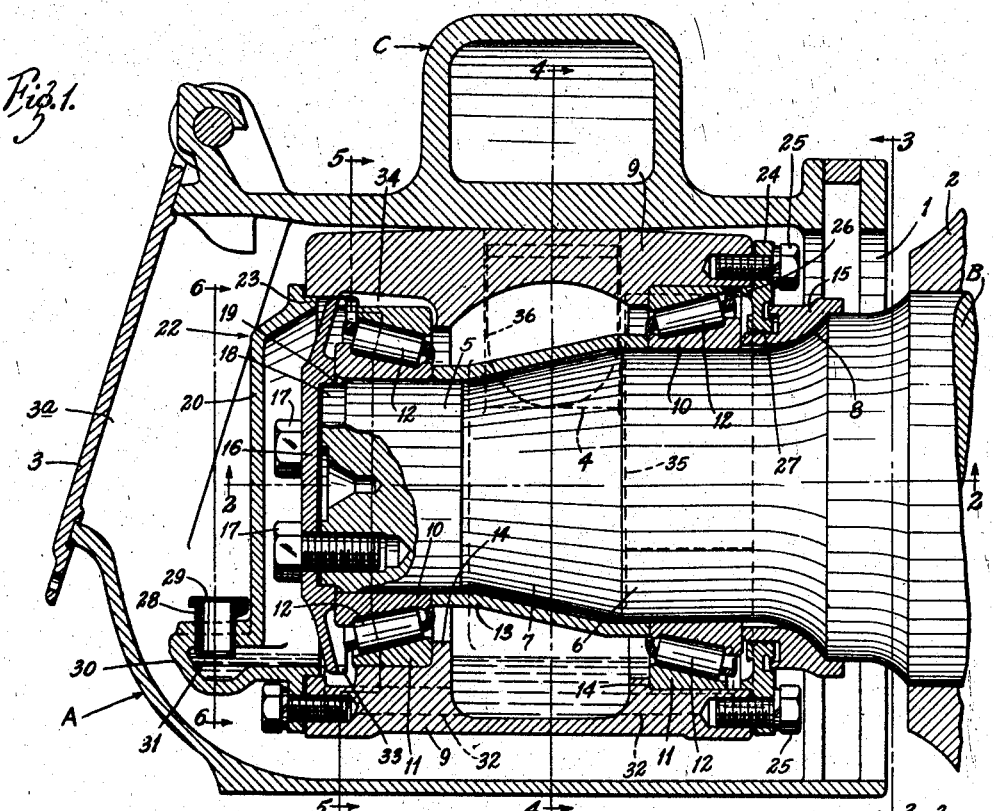
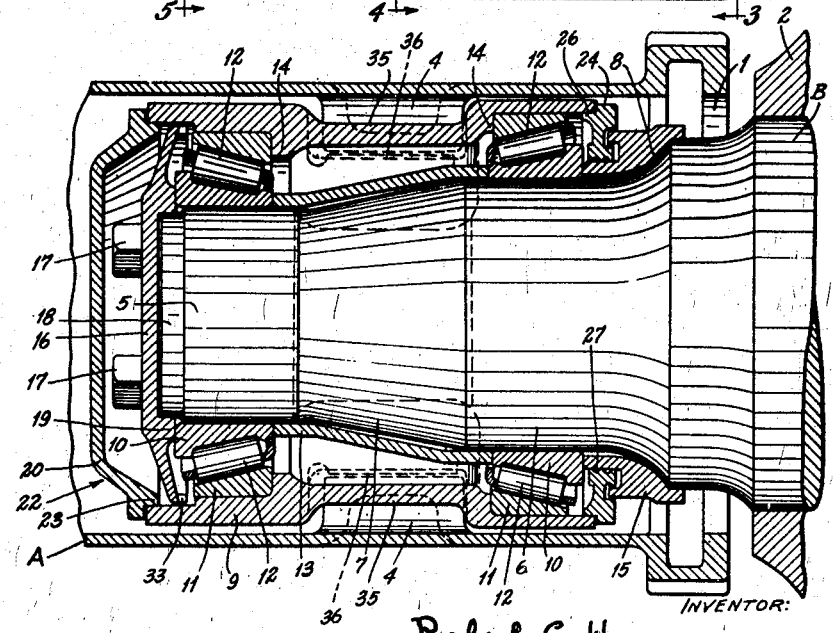

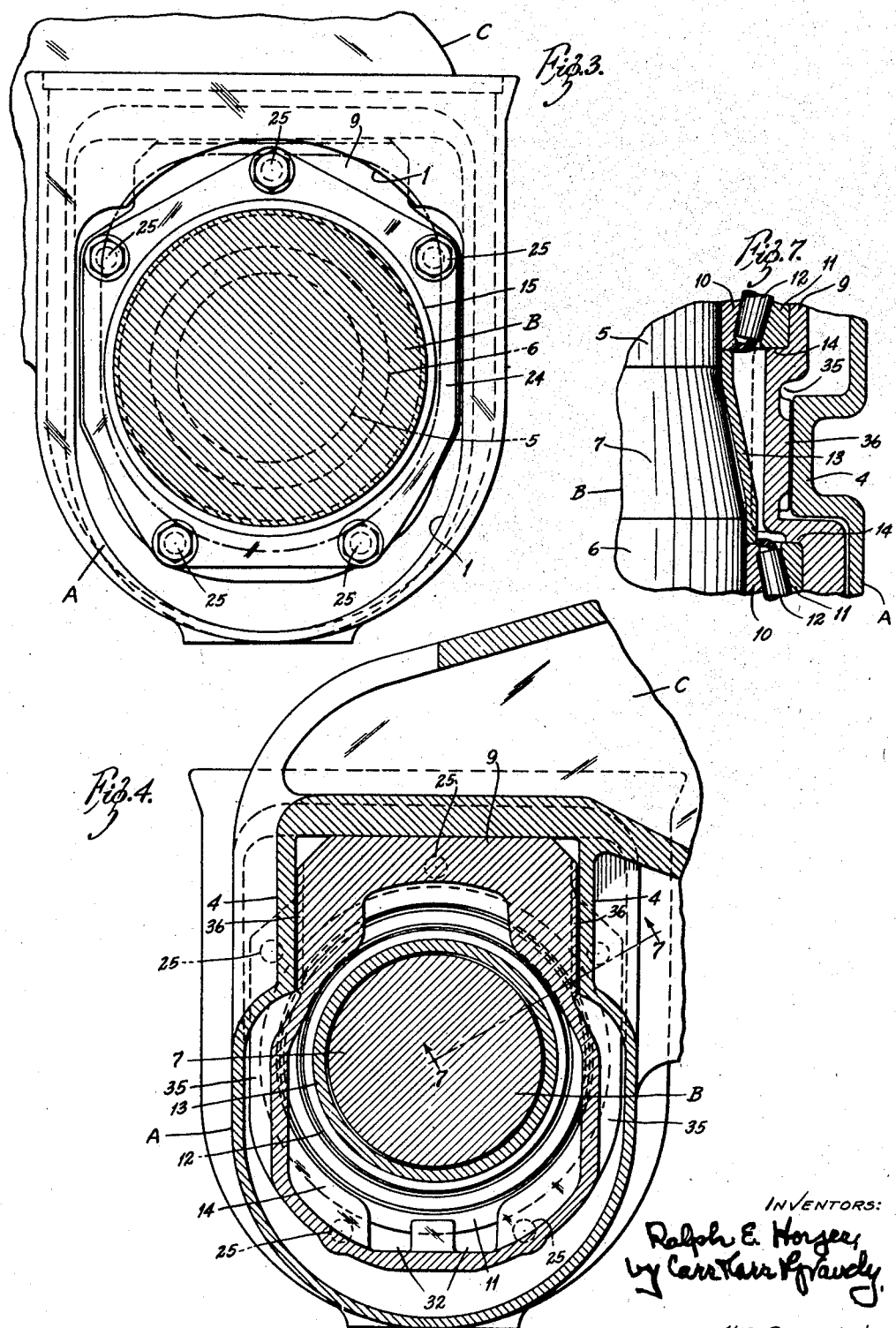

March 23, 1948.  R. E. HORGER  2,438,214
ROLLER BEARING RAILWAY CAR AXLE AND JOURNAL BOX ASSEMBLY
Filed May 22, 1944  3 Sheets-Sheet 3
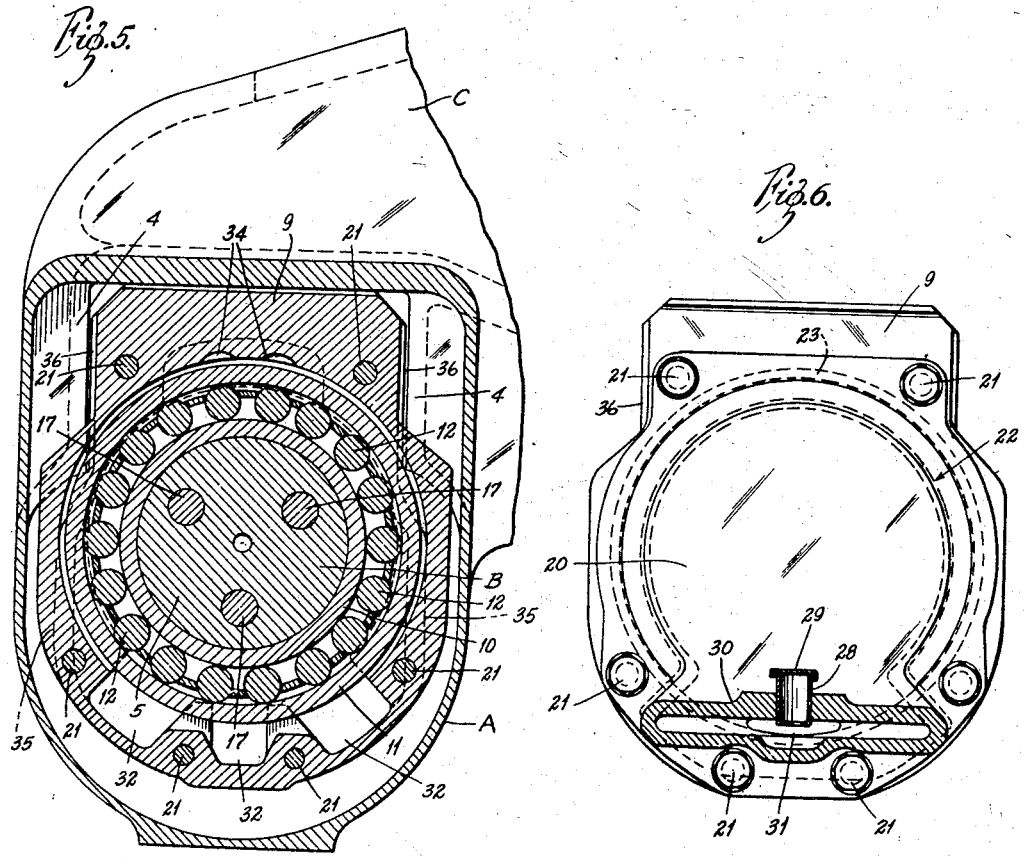
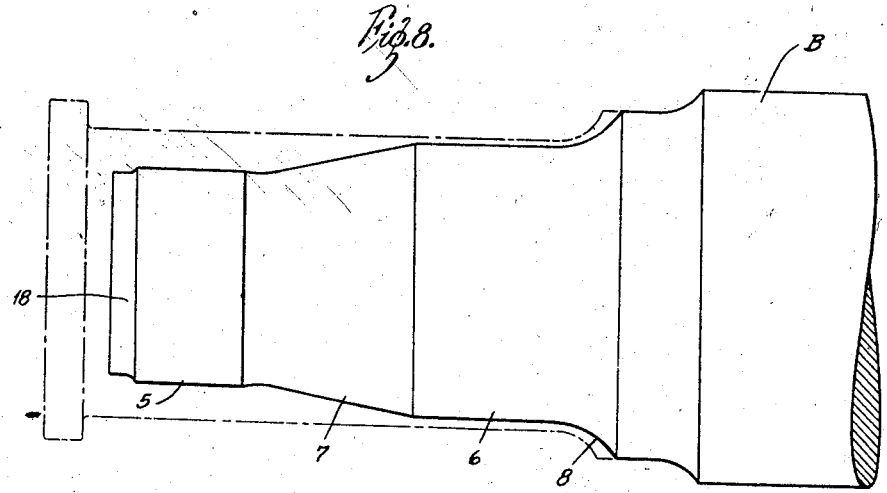
INVENTOR:
Ralph E. Horger,
by Carr Harr & Gravely
HIS ATTORNEYS.

Patented Mar. 23, 1948

2,438,214

UNITED STATES PATENT OFFICE 2,438,214

ROLLER BEARING RAILWAY CAR AXLE AND JOURNAL BOX ASSEMBLY

Ralph E. Horger, Canton, Ohio, assignor to The Timken Roller Bearing Company, Canton, Ohio, a corporation of Ohio Application May 22, 1944, Serial No. 536,669

5 Claims. (Cl. 308—180)

This invention relates to roller bearing railway car axle and journal box assemblies. It has for its principal objects to provide for the application of rotary antifriction bearings to standard A. A. R. axle and journal box assemblies without material alteration thereof; to provide a separate sealed oil containing cartridge for enclosing the bearings and for retaining them on the axle; to utilize the journal bearing retaining and thrust lugs of the A. A. R. journal box for holding said cartridge on the axle and to transmit the end thrust of the axle through the bearings; to permit endwise engagement and disengagement of said journal box and axle with the bearing containing cartridge mounted on the latter; to provide for proper circulation of the oil in the cartridge; to provide access to the cartridge through the opening in the outer end of the journal box for filling the cartridge with oil and for gauging the depth of the oil in the cartridge; and to attain other advantages hereinafter appearing. The invention consists in the rotary antifriction bearing axle and journal box assembly and in the method of altering standard A. A. R. axles and journal boxes to facilitate the substitution of rotary antifriction bearings for the plain journal bearings heretofore used with such axle box and journal box assemblies.

In the accompanying drawings, which form part of this specification and wherein like symbols refer to like parts wherever they occur, Fig. 1 is a central vertical longitudinal section through a roller bearing railway car axle and journal box construction embodying my invention, the journal box being shown integral with one end of a truck side frame, Fig. 2 is a central horizontal section on the line 2—2 in Fig. 1, Fig. 3 is a vertical cross-sectional view on the line 3—3 in Fig. 1, the dot-and-dash lines indicating the original size and shape of the dust guard opening in the inner end of the journal box, Fig. 4 is a vertical cross-sectional view on the line 4—4 in Fig. 1, Fig. 5 is a vertical cross-sectional view on the line 5—5 in Fig. 1, Fig. 6 is a vertical cross-sectional view on the line 6—6 in Fig. 1, Fig. 7 is a fragmentary cross-sectional view on the line 7—7 in Fig. 4; and Fig. 8 is a side elevational view of the axle, the dot-and-dash lines indicating the original size and shape of the journal portion of the axle.

The rotary antifriction bearing railway axle and journal box construction shown in the accompanying drawings comprises a standard A. A. R. journal box A and a standard A. A. R. axle B that projects into said journal box through the dust guard opening 1 in the inner end thereof and is provided with a car wheel 2 inwardly of said journal box. As shown in the drawings, the journal box A is formed integral with the end of the truck side frame C and is provided with the usual lid 3 for covering the access opening 3a in the outer end of said box and with the usual interior side wall journal bearing retaining and thrust lugs 4 that extend a short distance downwardly from the top of said box. The present construction dispenses with the usual plain journal bearing, journal box wedge and dust guard; and the only changes required in the journal box A and the axle B are to increase the size of the axle receiving opening 1 in the inner end of said journal box and to reshape the journal portion of said axle, both of these operations being comparatively simple machining operations. The reshaped journal portion of the axle B comprises a cylindrical outer end portion 5, a cylindrical inner end portion 6 of larger diameter, a tapered portion 7 connecting said cylindrical portions, and a tapered shoulder 8 at the inner end of said cylindrical inner end portion.

The rotary antifriction bearing construction for the above slightly modified A. A. R. axle and journal box assembly comprises two axially spaced taper roller bearings enclosed in a tubular non-rotary oil containing housing or cartridge 9, the innermost bearing being of larger diameter than the outermost bearing. Each of these roller bearings comprises a cone or inner raceway member 10 mounted on the cylindrical portion 5 or 6 of the axle B, a tapered cup or outer raceway member 11 seated in the cartridge, and a series of conical bearing rollers 12 interposed between said cone and cup. As shown in the drawings, the rollers 12 of the two bearings taper toward each other, the cones 10 are spaced apart by means of a conical sleeve 13 on the axle B and the large or opposing ends of the cups 11 are disposed in endwise abutting relation to internal annular shoulders 14 provided therefor in the cartridge 9.

A cone backing ring 15 is sleeved on the axle B in endwise abutting relation to the inner end of the cone 10 of the innermost bearing and has the inner end portion of its bore flared to seat against the tapered shoulder portion 8 of the axle. The bearing cones 10, spacing sleeve 13 and backing ring 15 are held on the axle B in endwise abutting relation to one another, with said backing ring seated against the shoulder 8 on said axle, by means of a circular plate 16 which is removably secured to the axle by means of cap screws 17. The axle B has a reduced outer end portion 18 that extends slightly beyond the outer end of the outermost bearing cone 10 and is adapted to snugly receive and support an annular rib 19 which is formed on the inner face of said plate and bears endwise against the outer end of said cone. The outer end of the bearing cartridge 9 is closed by means of a closure plate 20 that is removably secured to said end of said cartridge by means of cap screws 21. The closure plate 20 is offset outwardly, as at 22, inwardly of its peripheral margin so as to clear the heads of the retaining screws 21 for the plate. The end closure plate 20 has an annular pilot flange 23 at its inner end that snugly fits within the cartridge 9. Escape of oil from and entry of dust into the inner end of the bearing cartridge 9 is prevented by means of an annular end closure plate or ring 24 that is clamped flatwise against the inner end face of said cartridge by means of cap screws 25 and encircles the outer end of the cone backing ring 15. The end closure ring 24 has an annular pilot flange 26 on its inner face that snugly fits within the inner end of the cartridge 9; and said end closure ring and the cone backing ring 15 have cooperating annular rib and groove portions on their opposing end faces that form a labyrinth type running clearance space 27 therebetween.

As shown in the drawings, oil is supplied to the lower portion of the cartridge 9 for lubricating the bearings therein through an upright oil filler tube 28 which is provided at its upper end with a hinged cap or closure 29. The end closure plate 20 has a hollow outstanding ledge portion 30 adjacent to the lower end thereof forming an oil chamber or passageway 31 therein that opens into the lower portion of the cartridge 9. The oil filler tube 28 is supported on the ledge 30 of the cover plate 20 and opens downwardly into the oil chamber or passageway 31 in said ledge. The level of the chamber 31 is such that appearance of oil therein indicates that there is sufficient oil in the cartridge 9 to properly lubricate the bearings therein, while lack of oil in said chamber indicates that more oil should be added.

As shown in the drawings, longitudinal passageways 32 are provided through the lower portions of the cup supporting portions of the cartridge 9 so as to permit the oil to flow from the chamber 31 in the end closure cap 20 for the cartridge into the portion thereof between said cup supporting portions and thence through the innermost cup supporting portion into the inner end of the cartridge. The retaining plate 16 extends below the level of the oil filling and checking chamber 30 and has a notched peripheral flange 33 adapted to pick up oil and fling it into a longitudinal recess or groove 34 which is formed in the cartridge above the cup of the outermost bearing and serves to convey the oil to the small or inner ends of the rollers of said bearing. Some of the oil from the groove 34 is deposited on the small end of the tapered cone spacer 13 and flows upwardly along said spacer and is delivered to the small ends of the rollers of the innermost bearing.

As shown in the drawings, the upper surface of the cartridge 9 is longitudinally curved after the manner of a standard A. A. R. journal box wedge and the top of the journal box A seats on this convexly curved surface. The bearing cartridge 9 also has external vertical channels 35 in the side walls thereof adapted for cooperation with the journal bearing retaining and thrust lugs 4 in the sides of the A. A. R. journal box A so as to prevent endwise separation of the journal box and axle and limit relative axial movement thereof. By this arrangement, the front faces of the channels 35 cooperate with the journal box lugs 4 to prevent the journal box from slipping off the axle-cartridge assembly, while the rear faces of said channels cooperate with said journal box lugs to limit the outward axial movement of the axle-cartridge assembly and to transmit the end thrust of the axle to the innermost roller bearing. The outer side wall of the channel 35 in each side of the bearing cartridge 9 terminates at its upper end below the level of the upper end of the inside wall of said channel, and the depth of the enlarged dust guard opening 1 in the inner end wall of the journal box A is such that the journal box may be lifted off the cartridge far enough to bring the lower ends of the journal bearing retaining lugs 4 above the level of the upper end of the outer side walls of the channels in the bearing cartridge, thereby permitting endwise assembly and disassembly of the journal box and axle-cartridge. As shown in the drawings, the bottoms of the vertical channels 35 are provided with raised pad portions 36 that abut flatwise against the opposing faces of the journal bearing retaining lugs 4 so as to retain the cartridge in the journal box in an upright position.

The hereinbefore described roller bearing axle and journal box assembly has numerous advantages. It enables roller bearings to be substituted for the plain journal bearings of standard A. A. R. axles and journal boxes with the least possible alteration of the axle and journal box, the only changes required being the comparatively simple machine operations for enlarging the dust guard opening 1 in the inner end of the journal box and for changing the shape of the journal portion of the axle. The present construction utilizes the journal bearing retaining and thrust lugs 4 to prevent endwise separation of the axle and journal box in the operative position thereof; it also transmits the end thrust of the axle through the large innermost roller bearing; and it also permits endwise assembly and disassembly of the axle-cartridge and journal box when the lower ends of the journal box lugs are located above the level of the upper ends of the outer walls of the vertical channels in the sides of the bearing cartridge 9. The bearing cartridge 9 may be easily supplied with oil through the filler tube 28 at the outer end of said cartridge; and the oil level may be checked by inserting a finger through said tube into the chamber 31. Proper lubrication is provided for the roller bearings; and said bearings are protected by the cartridge which, in turn, is protected by the journal box. The increased size of the dust guard opening permits the cartridge to be made deep enough to provide an oil reservoir therein; and it also enables the walls of the cartridge to be made thick enough to accommodate tapped holes for the retaining screws for the end closure plate and the end closure ring.

The above roller bearing axle and journal box construction is assembled by mounting the cone backing ring 15 on the machine modified journal portion of the axle B in abutting relation to the tapered shoulder 8 thereon, then assembling the inner and outer bearings and spacing sleeve 13 in the cartridge 9 and securing the rear closure ring thereto, and then pressing the assembly on the axle. The combination oil flinger and retainer plate 16 is then secured by means of the cap screws 17 to the end of the axle in abutting relation to the outer end of the cone 10 of the outermost roller bearing. The end closure member 20 is then secured by the cap screws 21 to the outer end of the cartridge 9, thereby completing the axle-cartridge assembly. The journal box A with the machine modified dust guard opening 1 at the inner end thereof is then slipped over the axle-cartridge assembly, the journal box being lifted far enough to bring the lower ends of the lugs 4 in the journal box above the level of the lower ends of the front walls of the vertical channels 35 in the cartridge so as to permit such endwise assembly of the axle and journal box, the increase in the vertical dimension of said opening being sufficient to permit the journal box to be raised to the proper height. The assembly is then completed by lowering the journal box, thereby causing the lugs 4 thereof to enter the channels 35 of the bearing cartridge 9 and thus lock the journal box and cartridge together against endwise separation and against relative rotary movement. The parts are disassembled by lifting the journal box to bring the bottoms of the lugs 4 thereof above the level of the tops of the outer walls of the vertical channels 35 in the bearing cartridge 9 and then pulling the journal box forward to slide off said cartridge. The front closure 20 and the flinger 16 are then removed, after which the entire bearing cartridge assembly is stripped off the axle by placing a suitable pulling device at the back face of the cone backing ring 15.

Obviously, the hereinbefore described roller bearing axle and journal box assembly admits of considerable modification without departing from the invention. Therefore, I do not wish to be limited to the precise arrangements shown and described.

What I claim is:

1. A railway roller bearing axle and journal box assembly comprising a conventional one-piece plain bearing journal box having an enlarged dust guard opening in the inner end thereof and the usual interior journal bearing retaining and thrust lugs in the side walls thereof, an axle having a journal portion extending into said journal box through said opening, two axially spaced roller bearings mounted on the journal portion of said axle, and a sealed lubricant containing housing for said bearings and supporting said journal box from the top thereof, said housing having vertical channels in the exterior side faces thereof in which are received said lugs, there being a clearance between the housing and the bottom of the journal box large enough to permit relative vertical movement of said journal box and housing to engage and disengage said journal box lugs and said housing channels and said opening being large enough to permit passage of said housing through said opening.

2. A railway roller bearing axle and journal box assembly comprising a conventional one-piece plain bearing journal box having an enlarged dust guard opening in the inner end thereof and the usual interior journal bearing retaining and thrust lugs in the side walls thereof, an axle having a journal portion extending into said journal box through said opening, a rotary antifriction bearing mounted on the journal portion of said axle, and a housing for said bearing and supporting said journal box from the top thereof, said housing having outstanding shoulders on the exterior side faces thereof disposed longitudinally inwardly of said lugs in abutting relation thereto, there being a clearance between the housing and the bottom of the journal box large enough to permit relative vertical movement of said journal box and housing to move said shoulders and lugs into and out of such abutting relation and said opening being large enough to permit passage of said housing through said opening.

3. A railway roller bearing axle and journal box assembly comprising a conventional one-piece plain bearing journal box having an enlarged dust guard opening in the inner end thereof and the usual interior journal bearing retaining and thrust lugs in the side walls thereof, an axle having a journal portion extending into said journal box through said opening, rotary antifriction bearings mounted on the journal portion of said axle, and a housing for said bearings and supporting said journal box from the top thereof, said housing having vertical channels in the exterior side faces thereof in which are received said lugs, there being a clearance between the housing and the bottom of the journal box large enough to permit relative vertical movement of said journal box and housing to engage and disengage said lugs and said housing channels and said opening being large enough to permit passage of said housing through said opening.

4. A railway roller bearing axle and journal box assembly comprising a conventional one-piece plain bearing journal box having an enlarged dust guard opening in the inner end thereof and the usual interior journal bearing retaining and thrust lugs in the side walls thereof, an axle having a journal portion extending into said journal box through said opening, rotary antifriction bearings mounted on the journal portion of said axle, and a housing for said bearings and supporting said journal box from the top thereof, said housing having vertical channels in the exterior side faces thereof in which are received said lugs, the innermost side walls of said channels extending above the level of the tops of the outermost side walls thereof, there being a clearance between the housing and the bottom of the journal box large enough to permit the relative vertical movement of said journal box and housing required to bring the bottoms of said lugs above the level of the top of said outermost side walls of said channel and said opening being large enough to permit endwise assembly and disassembly of said journal box and housing through said opening.

5. A railway roller bearing axle and journal box assembly comprising a conventional one-piece plain bearing journal box having an enlarged dust guard opening in the inner end thereof, the usual covered access opening in the outer end thereof and the usual interior journal bearing retaining and thrust lugs in the side walls thereof, an axle having a journal portion extending into said journal box through said enlarged opening, rotary antifriction bearings mounted on the journal portion of said axle, and an oil containing housing for said bearings and supporting said journal box from the top thereof, said housing having vertical channels in the exterior side faces thereof in which are received said lugs, there being a clearance between the housing and the bottom of the journal box large enough to permit relative vertical movement of said journal box and housing to engage and disengage said lugs and channels and said opening being large enough to permit endwise assembly and disassembly of said journal box and housing through said opening, said housing having a hollow forwardly projecting ledge portion at the lower portion of its outer end, said ledge portion having an oil filler and inspection opening therein to which access may be had through the access opening in the outer end of said journal box.

RALPH E. HORGER.

REFERENCES CITED

The following references are of record in the file of this patent:

UNITED STATES PATENTS

| Number | Name | Date |
| --- | --- | --- |
| 1,638,957 | Pitt | Aug. 16, 1927 |
| 1,748,971 | Buckwalter | Mar. 4, 1930 |
| 1,748,973 | Buckwalter | Mar. 4, 1930 |
| 1,753,771 | Buckwalter | Apr. 8, 1930 |
| 1,773,874 | Scribner | Aug. 26, 1930 |
| 1,910,274 | Young | May 23, 1933 |
| 1,921,882 | Horger | Aug. 8, 1933 |
| 1,921,884 | Horger | Aug. 8, 1933 |
| 2,003,339 | Buckwalter | June 4, 1935 |
| 2,241,870 | Scribner | May 13, 1941 |
| 2,260,955 | Rudd | Oct. 28, 1941 |
| 2,274,187 | Buckwalter | Feb. 24, 1942 |
| 2,274,218 | Scribner | Feb. 24, 1942 |